F. FREDEEN.
DAM FOR PRODUCING POWER AND REGULATING THE DEPTH OF WATER IN STREAMS.
APPLICATION FILED JAN. 16, 1909.
935,749.
Patented Oct. 5, 1909.
2 SHEETS—SHEET 2.
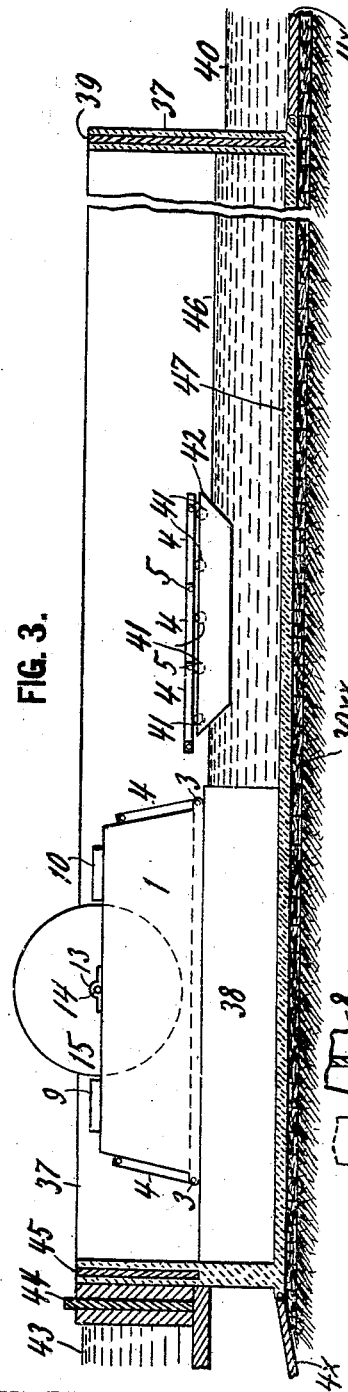
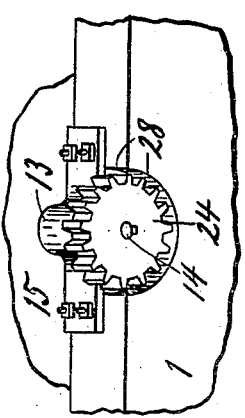
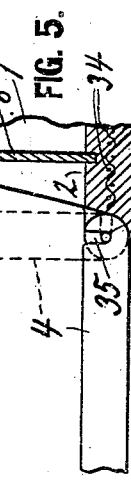
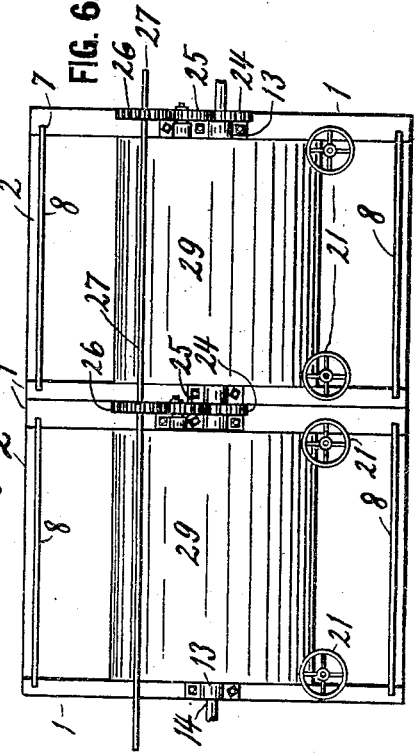
WITNESSES:
D. E. Carlsen.
E. C. Carlsen.
INVENTOR:
Frank Fredeen
BY HIS ATTORNEY:
A. M. Carlsen.

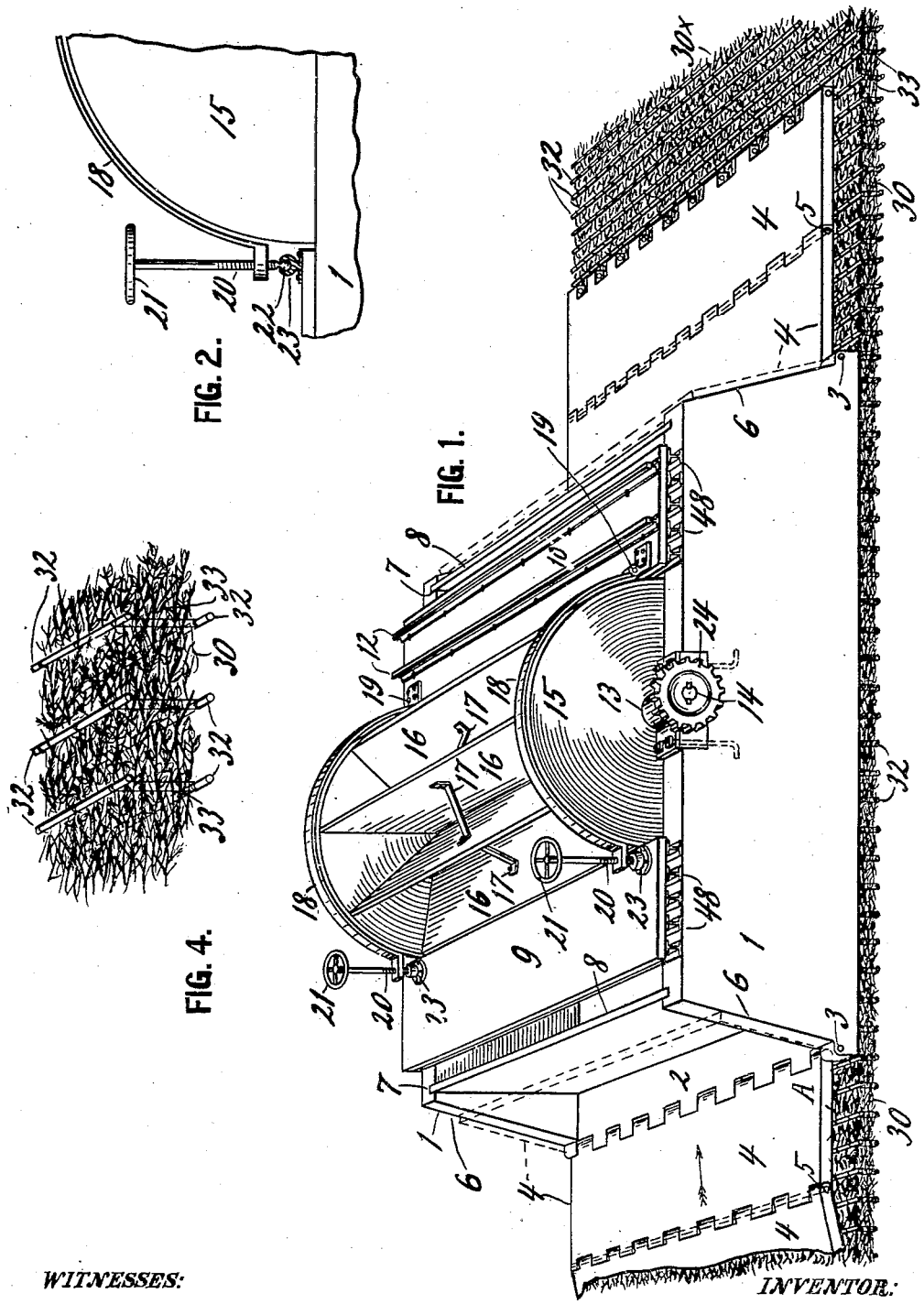

UNITED STATES PATENT OFFICE.

FRANK FREDEEN, OF TAYLORS FALLS, MINNESOTA.

DAM FOR PRODUCING POWER AND REGULATING THE DEPTH OF WATER IN STREAMS.

935,749.  Specification of Letters Patent.  Patented Oct. 5, 1909.

Application filed January 16, 1909. Serial No. 472,614.

*To all whom it may concern:*

Be it known that I, FRANK FREDEEN, a citizen of the United States, residing at Taylors Falls, in the county of Chisago and State of Minnesota, have invented a new and useful Dam for Producing Power and Regulating the Depth of Water in Streams, of which the following is a specification.

This invention relates to dams and the objects are to provide a combination of dams and waterwheels for regulating the height of the water in rivers and at the same time utilize the current of the water for power and the dam or dams as piers for bridges. These and other objects I attain by the novel construction and arrangement of parts and use of materials hereinafter described and illustrated in the accompanying drawings, in which:—

Figure 1 is a perspective view of one section of my improved dam shown as placed on a brush mat on the bottom of a river or canal and a water wheel mounted in it. Fig. 2 is an enlarged portion of Fig. 1 shown partly in section. Fig. 3 is a general sectional view of a combined lock and dock and one of my dam sections and a barge in it to give an idea of means and method for building floating and transporting the dam sections. Fig. 4 is a perspective view of a portion of a brush mat applied beneath the dam and its extending aprons. Fig. 5 is an enlarged edge or side view of the apron corner A in Fig. 1 with the adjacent corner B of the dam broken away. Fig. 6 is a top or plan view of two sections of the dam with the water wheels covered up, the bridges removed and some power transmitting means added. Fig. 7 is a perspective detail view of the gear and adjacent bearing shown near the middle of Fig. 1.

It will be understood that my dam is formed of as many sections as may be necessary to span the river or canal in which they are applied, some of the sections may be of the lock principle to allow vessels to pass up and down the river, but as the application of locks is well known for similar purposes I need not show or describe the same. The same is the case with swinging bridges or other bridges which may allow boats and vessels to pass through my dam, where the level of the water is not sufficiently disturbed by the dam to require a lock.

In the drawings 1 designates one of the dam sections. It consists mainly of two side walls 1, a bottom 2 made integral therewith, and having at both ends pivoted at 3 aprons 4, which are flexible by being made in several sections pivoted together as at 5. The section nearest each end of the dam may, during transportation, be turned upward to a leaning position against the dam as shown in dotted lines in Fig. 1. The corners 6 of the dam are for that purpose inclined, as also for the further purpose of breaking up floating ice that may drift against the dam.

Near each end of the dam slide in vertical grooves 7, gates 8, by which the ends of the dam are closed water-tight during floating and transportation of it and by opening said gates the water flows in and the section sinks.

Upon one end of each dam section is built a section of a wagon bridge 9 and upon the other end a railroad bridge 10 with rails 12 of which there may be any number according as the traffic may require. Between said bridges or near the middle of the dam section the side walls are provided at their tops with boxes 13 for the journals 14 of a water wheel 15, whose radial wings 16 are braced together at their middle by braces 17. The lower half of said winged wheel practically traverses and obstructs the passage for the water through the dam section below the axis or shaft of the wheel, and the water is never supposed to rise higher than to the axis of the wheel. Upon each end of the wheel is arranged a brake band 18, having one end secured at 19 to one of the bridges, and the other end adjustably secured to the other bridge by a tension screw 20, which is threaded through the end of the band and provided at its upper end with a hand wheel 21 and at its lower end with a ball 22 (see Fig. 2) turning in a ball socket 23 fixed on said other bridge so that by turning the brake wheel 21 the water wheel may be retarded in its rotation or even stopped entirely.

At one end of each water wheel or its shaft is fixed a gear wheel 24 from which the power of the wheel when water flows through the dam may be transmitted and used for any purposes required. In Fig. 6 I have indicated that much transmission may be made by an idler gear 25, another gear 26 and a shaft 27 secured in the latter gear and turning in bearings (not shown) mounted on the bridges or on the dam itself. It will be observed in Fig. 7 that the side wall of the dam has a cavity 28 for the reception of the gear 24 so as to enable the dam sections to be placed closely side by side across the river bed.

In Fig. 6 is shown how the water wheels may have their upper sides covered by covers 29 to help protect them from the effects of frost and storms.

When the dam is completed the sections form a continuous line across the river with a continuous railway bridge at one side and a combined foot and wagon bridge at the other side and a line of power shafting 27 from which power may be taken at one or both sides of the river, so that any drawbridge, lock-gate or other parts of the device requiring power, and all electric lighting necessary along the dam is all produced by one or more of the water wheels in the dam, besides what surplus power may be obtained and used for other purposes.

In further describing the operation of the device, if the river is sometimes too shallow for navigation and at other times flows over its banks, the brakes 18 may be applied until the wheels 15 retard the current sufficiently to maintain the desired water level, several dams being used where so required, and when the river rises above the desired level the brakes are to be released until the wheels turn freely enough to permit the water in the river to sink to the normal condition. To that end some of the water wheels may be uncoupled from the shaft 27 by any suitable coupling means (not shown) so that the wheel may revolve with perfect freedom. The wheels remaining in gear will still produce about the normal amount of power owing to the extra depth of water they engage in the water of the river. The current may also be retarded by simply lowering one of the gates 8, where no water wheel is used.

To prevent the water current from undermining the river bottom at either end of or underneath the dam, I cover the river bed under the device with a brush mat 30, which extends for a considerable distance beyond both ends of each dam section and is there nearly entirely covered by the flexible aprons, 4, whose extreme sections are sloped downward into the river bottom, at least the one above the dam, as shown to the left in Fig. 1, while below the dam the mat is extended beyond the apron as at $30^x$ in Fig. 1, so as to further prevent undermining by the water rushing through the dam section and also help to spread and restore the current to its normal flow in the river. If a river is too shallow for navigation, one or more of the dam sections in each dam may be made extra deep so as to maintain a deep-channel dug along the deepest portion of the river bed. Such channel will also form free passage for the water and prevent overflowing of the river in case of heavy rains or other causes.

As for the materials I use, the mat is formed of common brush bound together by rods 32 placed at top and bottom of the brush and secured together by ties 33 which may be of wire and the bars of either wood or iron.

The water wheels may be made of iron only or partly of wood. The gates 8 may be of iron or other suitable material. The body of the dam and also its aprons 4 I prefer to make of concrete reinforced by suitable network of iron as indicated at 34 in Fig. 5. In the latter figure it will also be seen that the apron section nearest the dam has its hinge members formed with notches 35 by which the section is made detachable from the dam when it is raised to a vertical position as shown in dotted lines, the flange 36 of the dam preventing accidental separation of the parts when the apron is folded away from the vertical position or even when raised. All the apron joints may be made likewise or they may have the pintle rods 3 removable.

The dam sections may be built and placed in a river or canal by various suitable means and methods which need not here be described. Some idea is given, however, in Fig. 3, where 37 designates a combined lock and dock in which each dam section may be built upon a bank or elevation 38 from which it is floated by filling the dock with water and then passing the section out of the gate 39 while the apron may be supported on rollers 41, upon barges like 42 and thus be ready for attaching to the dam section and sunk with it at the place where the dam is built. The structure 37 is also preferably of reinforced concrete and may be built and sunk upon a mat $30^{xx}$ in a river where many dams are to be constructed and then floated and removed to other places or rivers. In this case the water is admitted through the floodgate 39 from the river 40 and pumped out again while the gate 39 is closed. The same is the case if the dock is a stationary dry dock. In the latter case, however, the pumping may be avoided if access is had to a water source 43 at high enough elevation to let water into the dock therefrom through a dam gate 44 and a corresponding gate 45 in the dock, and then after the dam section is floated away from the elevation 38, close gates 44, 45 and open gate 39 to let the water 46 in the dock come down to a level with the adjoining river or river connection 40. Again the structure 37 may occasionally be used entirely as a floating dock, and that is the main reason for providing it with the gate 45 which closes that water inlet when the dock is sunk sufficiently deep in the water to float from either its bottom 47 or its elevated portion 38 any structure built thereon, or supported on barges resting thereon. In this manner the dock may be used for transporting several dam sections at one time to their destinations and when arriving there the dock may be sunk in shallow water and rest on the bottom thereof while the dam section and barges are floated out and the barges unloaded and replaced in the dock, whereupon the latter is floated by pumping it empty by any suitable pumping machinery, which it is not necessary to show here or describe.

In Fig. 3, 4ˣ represents aprons attached to the dock to prevent the water from undermining it when the dock is placed on the bottom of a shallow river for a long time.

In Fig. 1, 48 designates iron or steel beams resting with their ends on the walls of the dam and supporting the bridges 9 and 10 upon them. Where the dam section is very wide I may support these beams at the middle either by props underneath or bracework above them as is common in bridge building and therefore need not be here shown or further described.

Having thus described my invention, what I claim is:

1. In a structure for any of the purposes set forth, a sinkable pier or supports formed of a bottom and two walls standing upon the bottom near two opposite edges thereof and adapted to stand edgewise to the current of the water, and aprons detachably hinged to each end of the bottom.

2. In a structure for any of the purposes set forth, a sinkable pier or supports formed of a bottom and two walls standing upon the bottom near two opposite edges thereof and adapted to stand edgewise to the current of the water, and aprons detachably hinged to each end of the bottom, said aprons being each composed of several sections pivotally connected together.

3. In a structure for any of the purposes set forth, a sinkable pier or supports formed of a bottom and two walls standing upon the bottom near two opposite edges thereof and adapted to stand edgewise to the current of the water, and aprons detachably hinged to each end of the bottom, said aprons being each composed of several sections pivotally connected together, and a brush mat extending underneath said bottom and aprons.

4. In a structure for any of the purposes set forth, a pier or support of concrete, iron or the like, the same having a bottom and two parallel walls formed integral with the bottom near opposite edges thereof, said walls having near their ends vertical grooves in their inner sides and slidable plates or gates inserted in said grooves.

5. In a structure for any of the purposes set forth, a pier or support of concrete, iron or the like, the same having a bottom and two parallel walls formed integral with the bottom near opposite edges thereof, said walls having near their ends vertical grooves in their inner sides and slidable plates or gates inserted in said grooves, said walls having their ends inclined so as to make the top of each wall shorter than the base for the purpose set forth.

6. In a structure of the kind described, a plurality of sinkable sections made of reinforced concrete and comprising each a base or bottom with a pair of parallel walls projecting upwardly therefrom and adapted to stand edgewise to the current of the water, a water wheel interposed between said walls and having end journals and boxes thereon supported by the walls at such height relative to the water that the water line will always be more or less below the axis of the wheel, braking means for retarding the speed of the wheel, and means connected with the wheel for producing and transmitting power therefrom.

7. In a structure of the kind described, a plurality of sinkable sections made of reinforced concrete and comprising each a base or bottom with a pair of parallel walls projecting upwardly therefrom and adapted to stand edgewise to the current of the water, a water wheel interposed between said walls and having end journals and boxes thereon supported by the walls at such a height relative to the water that the water line will always be more or less below the axis of the wheel, braking means for retarding the speed of the wheel and means connected with the wheel for producing and transmitting power therefrom, and supported upon said wall, bridges for wagons and for railroads.

8. In a structure of the kind described, a plurality of sinkable sections made of reinforced concrete and comprising each a base or bottom with a pair of parallel walls projecting upwardly therefrom and adapted to stand edgewise to the current of the water, a water wheel interposed between said walls and having end journals and boxes thereon supported by the walls at such a height relative to the water that the water line will always be more or less below the axis of the wheel, braking means for retarding the speed of the wheel and means connected with the wheel for producing and transmitting power therefrom, and supported upon said walls, bridges for wagons and for railroads, said bridges being arranged the wagon bridge at one side of the wheel and the railroad bridge at the other side of it, and rails on the latter bridge for the trains to run on.

In testimony whereof I affix my signature, in presence of two witnesses.

FRANK FREDEEN.

Witnesses:
 A. M. CARLSEN,
 D. E. CARLSEN.